(12) United States Patent
Huang et al.

(10) Patent No.: US 11,537,236 B1
(45) Date of Patent: Dec. 27, 2022

(54) FINGERPRINT SENSING DEVICE AND SIGNAL PROCESSING METHOD THEREOF

(71) Applicant: Novatek Microelectronics Corp., Hsinchu (TW)

(72) Inventors: Min Huang, Taoyuan (TW); Jung-Yu Tsai, New Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/748,007

(22) Filed: May 18, 2022

Related U.S. Application Data

(60) Provisional application No. 63/300,054, filed on Jan. 17, 2022.

(51) Int. Cl.
*G06F 3/041* (2006.01)
*G06V 40/13* (2022.01)
*G06F 3/042* (2006.01)

(52) U.S. Cl.
CPC ........ *G06F 3/04182* (2019.05); *G06F 3/0421* (2013.01); *G06V 40/1318* (2022.01)

(58) Field of Classification Search
CPC .............. G06F 3/04182; G06F 3/0421; G06V 40/1318

USPC ......................................................... 345/175
See application file for complete search history.

(56) References Cited

U.S. PATENT DOCUMENTS

| 2002/0085109 | A1* | 7/2002 | Nakamura | ........... H04N 5/2351 348/304 |
| 2002/0190229 | A1* | 12/2002 | Nakamura | ............. H04N 5/235 348/E3.019 |
| 2009/0252385 | A1* | 10/2009 | Dean | .................. G06V 40/1306 382/124 |
| 2021/0303815 | A1* | 9/2021 | Chung | .................... G06F 3/044 |

* cited by examiner

*Primary Examiner* — Jimmy H Nguyen
(74) *Attorney, Agent, or Firm* — JCIPRNET

(57) ABSTRACT

The fingerprint sensing device that includes a first analog front end (AFE) circuit, a compensation circuit, a correction circuit and an output circuit is introduced. The AFE circuit generates a first image signal according to the fingerprint data read from the plurality of rows of the fingerprint sensor. The correction circuit receives a first output digital code that is generated by reading a predetermined row among the plurality of rows of the fingerprint sensor, and calculates a brightness correction value and a relative illumination (RI) correction value according to the first output digital code. The compensation circuit modifies the first image signal according to the brightness correction value and the RI correction value to generate a second image signal. The output circuit is configured to generate a second output digital code according to the second image signal.

20 Claims, 11 Drawing Sheets

FINGERPRINT SENSING DEVICE AND SIGNAL PROCESSING METHOD THEREOF

CROSS-REFERENCE TO RELATED APPLICATION

This application claims the priority benefit of U.S. provisional application Ser. No. 63/300,054, filed on Jan. 17, 2022. The entirety of the above-mentioned patent application is hereby incorporated by reference herein and made a part of this specification.

BACKGROUND

Technical Field

The disclosure generally relates to fingerprint recognition, and more particularly, to a fingerprint sensing device and a signal processing method that are capable of enhancing performance of fingerprint recognition.

Description of Related Art

Fingerprint sensing devices are widely used in a variety of electronic devices such as mobile phone, laptop and personal digital assistant (PDA) for fingerprint recognition. Recently, optical fingerprint recognition is one of the most popular fingerprint recognition schemes, in which reflected light passing through an optical lens of the fingerprint sensing device is captured by an image sensor to generate a fingerprint image signal. However, various noises and offsets may be included in the fingerprint image signal, resulting in limited signal quality of the fingerprint image signal and low performance of the fingerprint recognition.

As a demand for high-quality fingerprint recognition has grown recently, it is desirable to enhance the performance of fingerprint sensing and fingerprint recognition. Nothing herein should be construed as an admission of knowledge in the prior art of any portion of the present disclosure.

SUMMARY

A fingerprint sensing device and a signal processing method thereof that are capable of enhancing the performance of fingerprint recognition are introduced.

The fingerprint sensing device may include a readout circuit, a first analog front end (AFE) circuit, a compensation circuit, a correction circuit and an output circuit. The readout circuit is configured to read fingerprint data from a plurality of rows of the fingerprint sensor. The AFE circuit is configured to generate a first image signal according to the fingerprint data read from the plurality of rows of the fingerprint sensor. The correction circuit is configured to receive a first output digital code that is generated by reading a predetermined row among the plurality of rows of the fingerprint sensor. The correction circuit is further configured to calculate a brightness correction value and a relative illumination (RI) correction value according to the first output digital code. The compensation circuit is configured to modify the first image signal according to the brightness correction value and the RI correction value to generate a second image signal. The output circuit is configured to generate a second output digital code according to the second image signal.

The signal processing method may include steps of reading fingerprint data from a predetermined row of a fingerprint sensor to generate a first output digital code; calculating a brightness correction value and a relative illumination (RI) correction value according to the first output digital code; reading fingerprint data from a plurality of rows of the fingerprint sensor; generating a first image signal according to the fingerprint data read from the plurality of rows of the fingerprint sensor; modifying the first image signal according to the brightness correction value and the RI correction value to generate a second image signal; and generating a second output digital code according to the second image signal.

In some embodiments, the fingerprint sensing device reads a predetermined row of a fingerprint sensor to obtain a first output digital code, and calculates correction values (i.e., a brightness correction value, a RI correction value and a gain value) according to the first output digital code. After the correction values are calculated, the fingerprint sensing device correct an image signal (or fingerprint image signal) reading from the plurality of the rows of the fingerprint sensor according to the correction values. In this way, the offsets caused by different factors are corrected in one single image frame, resulting in a quick and accurate fingerprint sensing and recognition. In addition, the amplitude of peaks and valleys of fingerprint in the fingerprint image signal may be enhanced according to the calculated gain value to improve the signal quality of the fingerprint image signal. Furthermore, the full scale range of the ADC may be adjusted according to the calculated gain value to enhance the resolution of the ADC. In this way, the performance of the fingerprint recognition of the fingerprint sensing device is improved.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
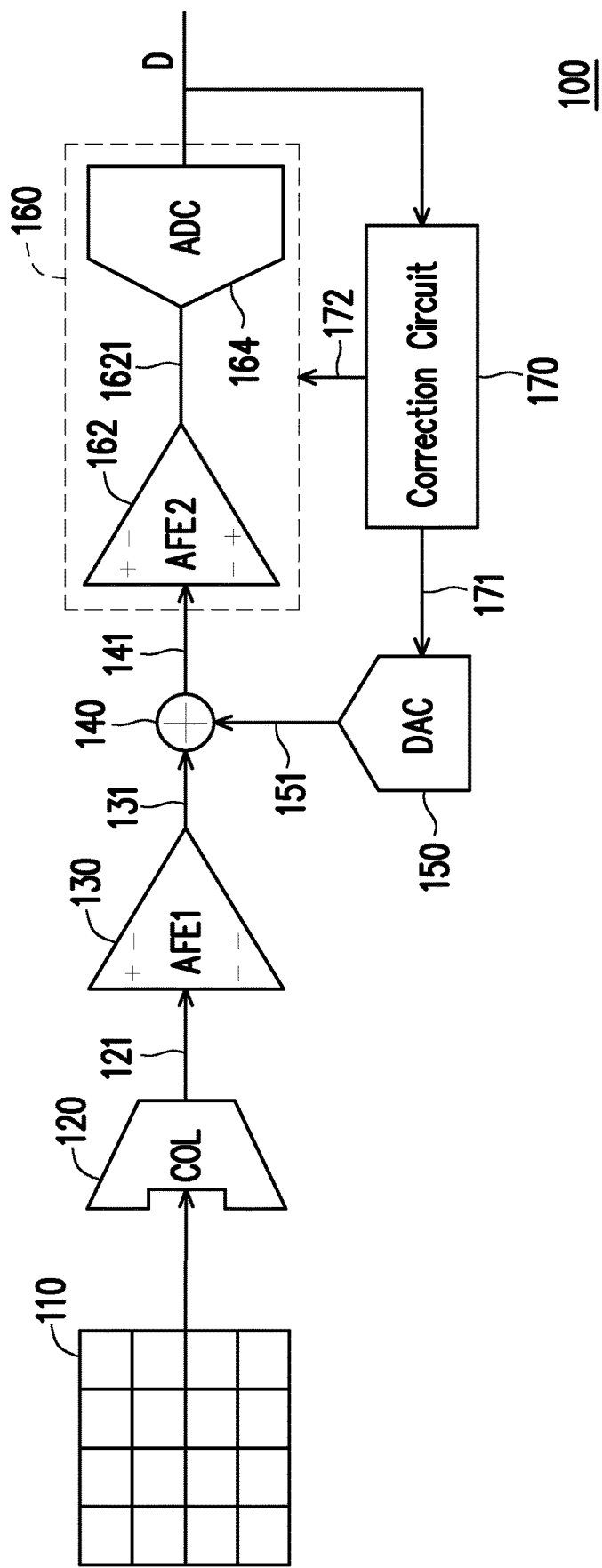
FIG. 1 illustrates a schematic diagram of a fingerprint sensing device in accordance with some embodiments.

FIG. 1 illustrates a schematic diagram of a fingerprint sensing device 100 in accordance with some embodiments. The fingerprint sensing device 100 may include a fingerprint sensor 110, a readout circuit 120, an analog-front-end (AFE) circuit 130, a compensation circuit 140, a digital-to-analog converter (DAC) 150, an output circuit 160 and a correction circuit 170 in accordance with some embodiments. The fingerprint sensor array 110 may include a plurality of pixels arranged in rows and columns, and the fingerprint sensor 110 is configured to sense a fingerprint of a user. For example, the fingerprint sensor array 110 may be optical fingerprint sensor that captures an image of the user's fingerprint through the pixels of the fingerprint sensor 110 to generate a sensing signal (or an image signal). In some embodiments, the fingerprint sensing device 100 is an optical fingerprint sensing device 100 that is disposed together with a light source (not shown) and a lens or a lens set (not shown) under a sensing pad or a panel of an electronic apparatus (not shown). The light source and the lens set may be included in or coupled to the optical fingerprint sensing device 100. The light source is configured to emit light to a touch finger on the sensing pad or the panel, and the lens may focus the reflected light from the touch finger to the fingerprint sensor 110 for generating the sensing signal (or the image signal). The lens may include a biconvex lens, a convex-concave (positive meniscus) lens, a plano-convex lens, a plano-concave lens, or a combination thereof. The lens may be characterized by a lens pattern which may refer to relative illumination (RI) of the lens corresponding to a distance of a sensing pixel from a central pixel which corresponds to a center of the lens.

The readout circuit 120 is coupled to the fingerprint sensor 110 and is configured to read out fingerprint data from pixels of the fingerprint sensor 110 to generate a sensing signal 121. The readout circuit 120 may selectively read at least one sensing pixel of the fingerprint sensor 110. For example, the readout circuit 120 may read out a particular row fingerprint sensor 110, or may read out sequentially a plurality of rows of the fingerprint sensor 110 to generate sensing signal 121. The readout circuit 120 may output the sensing signal 121 to the AFE circuit 130.

The AFE circuit 130 is coupled to the readout circuit 120, and is configured to generate an image signal 131 based on the sensing signal 121 outputted from the readout circuit 120. The AFE circuit 130 may perform processing operations on the sensing signal 121 to generate the image signal 131. For example, the AFE circuit 130 may perform a sampling operation, an amplifying operation and/or a compensation operation on the sensing signal 121 to reduce noises and improve signal quality of the sensing signal 121.

The AFE circuit 130 is configured to output the image signal 131 to the compensation circuit 140. The disclosure does not intend to limit a circuit structure and operations of the AFE circuit 130.

The compensation circuit 140 is coupled to the DAC 150 and the AFE circuit 130 to receive the image signal 131 from the AFE circuit 130 and a correction signal 151 from the DAC 150. The compensation circuit 140 is configured to compensate the image signal 131 according to the correction signal 151 to generate a compensated signal 141. The compensation circuit 140 may include an adder circuit that is configured to add the correction signal 151 to the image signal 131 to generate the compensated signal 141. In some embodiments, the correction signal 151 is configured to correct offsets caused by a brightness variation and offsets caused by the lens pattern (i.e., relative illumination) on the image signal 131. The offsets caused by the brightness variation may be impacted by environmental light intensity and/or light intensity of a panel region where the touch finger is located and/or other factors. The offsets caused by the lens pattern may be impacted by optical features (i.e., RI characteristic) of the lens. For example, the central region of the lens (with shorter distance from the lens center) has higher relative illumination than the peripheral region. As such, sensing signals from pixels corresponding to the central region of the lens usually have higher brightness than sensing signals from pixels corresponding to peripheral regions of the lens. The detailed description about corrections of offsets caused by the brightness variation and offsets caused by the lens pattern will be provided in association with FIG. 7A, FIG. 7B and FIG. 8.

The output circuit 160 is coupled to the compensation circuit 140 and is configured to generate a digital output code D according to the compensated signal 141. The digital output code D is a digital representation of the user's fingerprint (i.e., peaks and valleys of the user's fingerprint) being sensed through the finger sensor 110. In some embodiments, the output circuit 160 includes an AFE circuit 162 and an analog to digital converter (ADC) 164. The AFE circuit 162 is configured to amplify the compensated signal 141 based on gain value to generate an amplified signal 1621, in which the gain value may be calculated by the correction circuit 170. In some embodiments, the AFE circuit 162 amplifies the compensated signal 141 to generate increase the amplitude of peaks and valleys of the fingerprint in the compensated signal 141 to generate the amplified signal 1621. The ADC 164 has a full scale range which corresponds to an operating voltage range of the ADC 164, and a number of bits of the ADC 164 spans the full scale range of the ADC. The ADC 164 is coupled to the AFE circuit 162 and is configured to convert the amplified signal 1621 to generate the digital output code D. In some embodiments, the full scale range of the ADC 164 may be adjusted according to the gain value that is calculated by the correction circuit 170, so as to improve a resolution of the ADC 164. The gain value is represented as a correction value 172 outputted from the correction circuit 170 to the output circuit 160. The description about the gain value, the signal enhancement and the adjustment of the full scale range will be described in association with FIG. 9A through FIG. 9C.

The correction circuit 170 is coupled to the output circuit 160 and is configured to generate correction values 171 and 172 according to the output digital code D. The correction value 171 is provided to the DAC 150, and the DAC 150 converts the correction value 171 which is in the digital form to the correction signal 151 which is in the analog form. In some embodiments, the correction value 171 includes at least one of a brightness correction value and a RI correction value. The DAC 150 may convert the brightness correction value and the RI correction value in the correction value 171 to generate a brightness correction signal and a RI correction signal which are represented as the correction signal 151 in FIG. 1.

Figure 2:
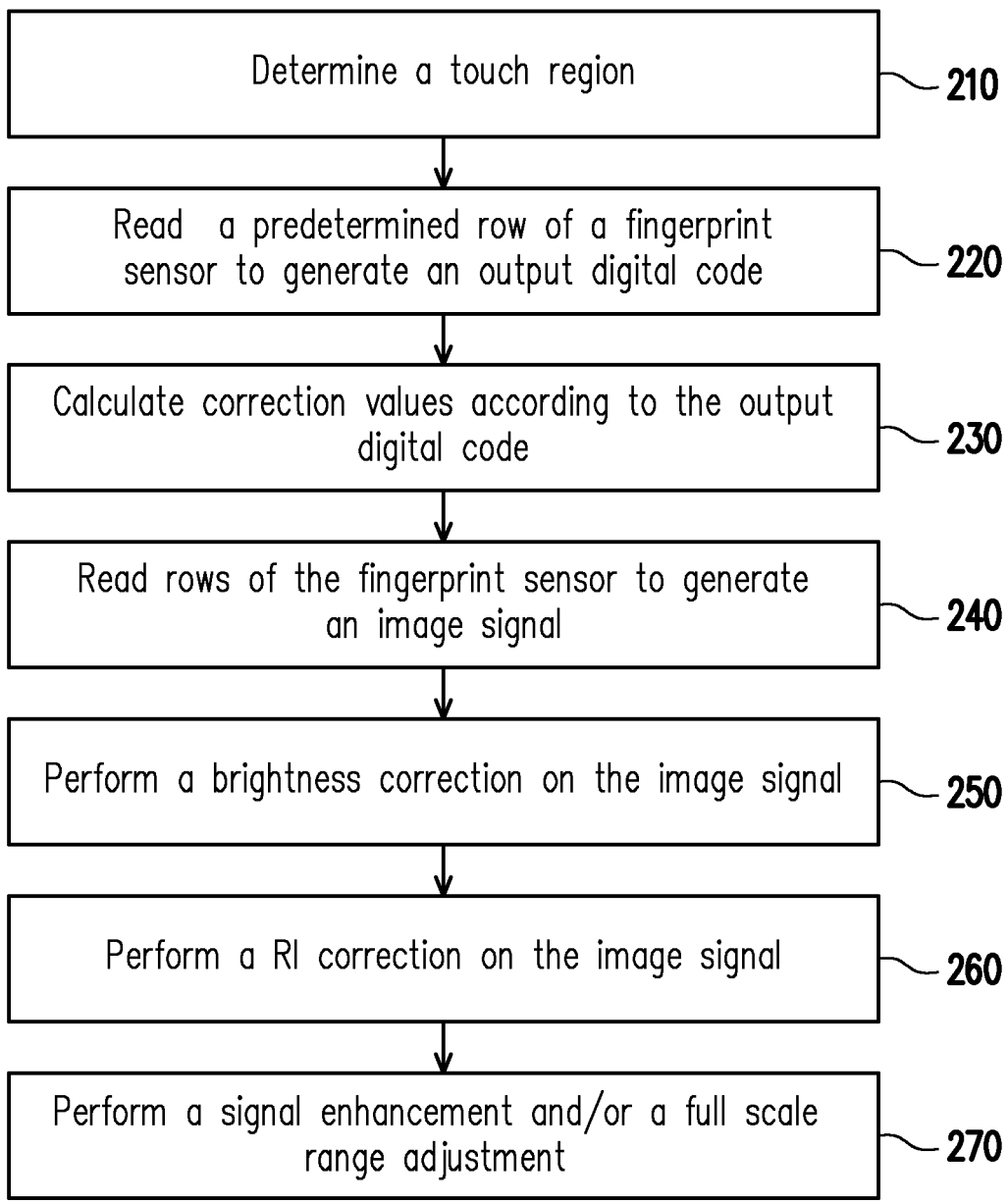
FIG. 2 illustrates a flowchart diagram of a signal processing process adaptable to a fingerprint sensing device in accordance with some embodiments.
Figure 3:
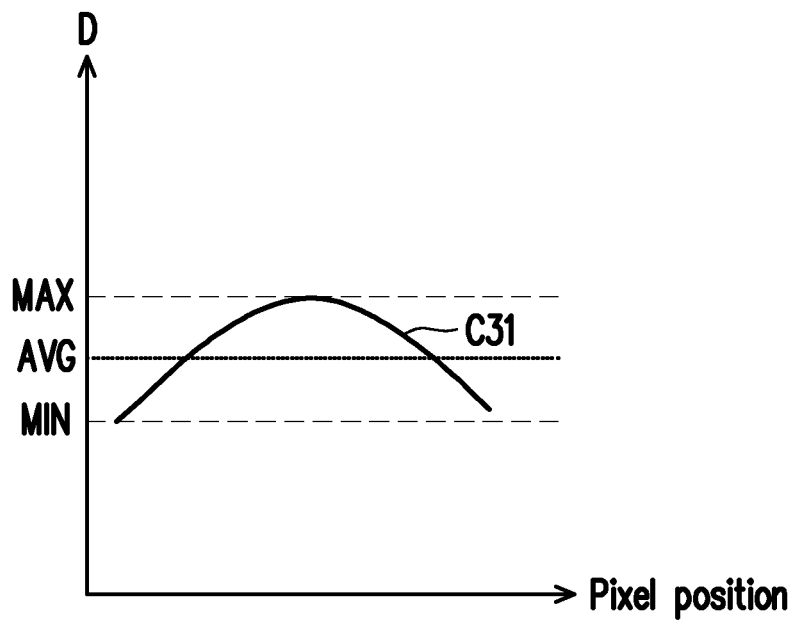
FIG. 3 is a diagram illustrating an output digital code reading from a row of a fingerprint sensor in accordance with some embodiments.

FIG. 2 illustrates a flowchart of a signal processing process adaptable for a fingerprint sensing device (i.e., fingerprint sensing device 100 in FIG. 1) in accordance with some embodiments. Referring to FIG. 1 and FIG. 2, the fingerprint sensing device 100 determines a touch region of a user's finger in step S210. In step S220, a fingerprint sensing device 100 reads fingerprint data from a predetermined row of the fingerprint sensor 110 to generate an output digital code. Since each row of the fingerprint sensor 110 includes a plurality of pixels, the output digital code obtained by reading the predetermined row includes a plurality of pixel output digital codes corresponding to pixels of the predetermined row. As such, the output digital code of the predetermined row may be illustrated as a curve (i.e., curve C31 in FIG. 3). FIG. 3 is a diagram illustrating an exemplary curve C31 that represents the output digital code obtained by reading the predetermined row of the fingerprint sensor 110 in accordance with some embodiments. The vertical axis of the diagram represents the output digital code D, and the horizontal axis of the diagram represents positions of pixels in the predetermined row. FIG. 3 further shows an average value AVG, a maximum value MAX and a minimum value MIN, in which the average value AVG is an average of the pixel output digital codes that forms the curve C31, the minimum value MIN is the minimum code among the pixel output digital codes, and the maximum value MAX is the maximum code among the pixel output digital codes. The average value AVG, the maximum value MAX or the minimum value MIN of the output digital code may be used to calculate the correction values.

In step S220 of FIG. 2, the correction values are calculated according to the output digital code of the predetermined row, in which the correction values may include at least one of a brightness correction value, a lens pattern correction value, and a gain value. The calculation of the correction values in step S220 may be executed by the correction circuit (i.e., the correction circuit 170 in FIG. 1) of the fingerprint sensing device 100.

In some embodiments, the correction circuit 170 is configured to calculate the brightness correction value according to the output digital code of the predetermined row, the full scale range of the ADC 164 and the number of bits of the ADC 164 (or the number of bits of the DAC 150). In an example, the brightness correction value $\Delta DAC_{LM}$ is calculated according to equation (1), in which AVG is the average (or mean) of pixel output digital codes of the output digital code obtained by reading the predetermined row, FS is the full scale range of the ADC 164, the ADCbit is number of bits of the ADC 164, and the DACbit is number of bits of the DAC 150. In another example, the average value AVG in the equation (1) may be replaced by the maximum value MAX or the minimum value MIN among the pixel output digital codes of the output digital code.

$$\Delta DAC_{LM} = \frac{AVG - FS/2}{ADCbit/DACbit} \quad (1)$$

The brightness correction value $\Delta DAC_{LM}$ may corresponds to a shift amount (i.e., voltage level or current level) of the image signal (i.e., image signal 131 in FIG. 1) to correct the offsets caused by the brightness variations. The brightness correction value $\Delta DAC_{LM}$ may be converted to a brightness correction signal by the DAC 150 and is used to compensate the image signal by the compensation circuit 140.

Figure 4:
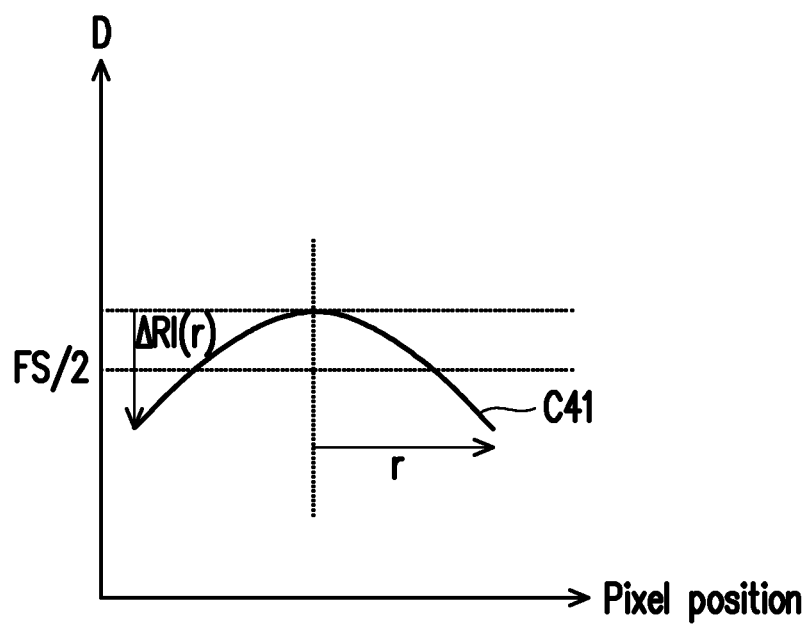
FIG. 4 is a diagram illustrating a relative response (RI) characteristic of a lens in accordance with some embodiments.

In some embodiments, the correction circuit 170 is further configured to calculate the RI correction value according to output digital code of the predetermined row and the number of bits of the ADC 164 (or the number of bits of the DAC 150). Since the output digital code is obtained by reading all pixels included in the predetermined row of the fingerprint sensor, the output digital code obtained by reading the predetermined row may reflect the RI response of entire surface of the lens. According to the RI response of the lens (or the output digital code obtained by reading the predetermined row), the correction circuit 170 may calculate the RI correction value (also referred to as an anti-RI gain value) corresponding to each pixel of the predetermined row. For example, the correction circuit 170 may calculate the RI correction value $\Delta DAC_{RI}(r)$ corresponding to each pixel of the predetermined row according to equation (2), in which r is a distance from a target pixel to a central pixel which corresponds to a central point of the lens, $\Delta RI(r)$ is a difference between the RI corresponding to the target pixel and the RI corresponding to the central pixel, ADCbit is number of bits of the ADC 164, and the DACbit is number of bits of the DAC 150. FIG. 4 illustrates exemplary values of r and $\Delta RI(r)$ on a diagram of the output digital code (i.e., curve C41) that is obtained by reading the predetermined row of the fingerprint sensor 110. The vertical axis and the horizontal axis of the diagram in FIG. 4 represents the digital output code and the pixel position respectively.

$$\Delta DAC_{RI}(r) = \frac{\Delta RI(r)}{ADCbit/DACbit} \quad (2)$$

The RI correction value $\Delta DAC_{RI}(r)$ may indicate a shift amount (i.e., voltage level or current level) of the image signal (i.e., image signal 131 in FIG. 1) to correct the offsets caused by RI characteristic of the lens. Because of the RI characteristic, the pixels corresponding to the central region of the lens usually have higher brightness than the pixels corresponding to the peripheral regions of the lens (offsets caused by the RI characteristic). In some embodiments, the RI correction value $\Delta DAC_{RI}(r)$ are not fixed for all pixels in a row of the fingerprint sensor 110. Instead, the RI correction value $\Delta DAC_{RI}(r)$ may vary according to the distance r from the pixel to the central pixel. As such, a lookup table may be used to store the RI correction value $\Delta DAC_{RI}(r)$ for each pixel of the fingerprint sensor 110 according to the distance r from the pixel to the central pixel. The lookup table may store one-to-one relationship between the pixels of the fingerprint sensor 110 and the RI correction value $\Delta DAC_{RI}(r)$. In other words, when the fingerprint sensor 110 has n pixels, there are n RI correction values $\Delta DAC_{RI}(r)$ in the lookup table.

In some embodiments, the correction circuit 170 is configured to calculate a gain value G according to a difference between the full scale range of the ADC 164 and a swing range of the compensated signal 141. For example, the gain value G may be calculated according to the equation (3), in which FS is the full scale range of the ADC 164 and dsig is the swing range of the compensated signal 141. The swing range dsig defines a range of peaks and valleys of the fingerprint in the compensated signal 141, and is illustrated as a range from (FS/2+dsig) to (FS/2−dsig) in FIG. 9A through FIG. 9C.

$$G = \frac{FS - (FS/2 + dsig)}{dsig} \quad (3)$$

The gain value G may be used to enhance amplitude of peaks and valleys of fingerprint in the compensated signal (i.e., higher AFE gain for the AFE circuit 162) and/or to improve the resolution of the ADC 164 (higher ADC gain for the ADC 164).

After the correction values are calculated in step S220, step 230 is executed. In step S230, fingerprint data from a plurality of rows of the fingerprint sensor 110 are read out sequentially to generate an image signal. Referring to FIG. 1 and FIG. 2, the readout circuit 120 and the AFE circuit 130 may read out and amplify the fingerprint data from the rows of the fingerprint sensor 110 to generate the image signal 131.

Figure 5A:
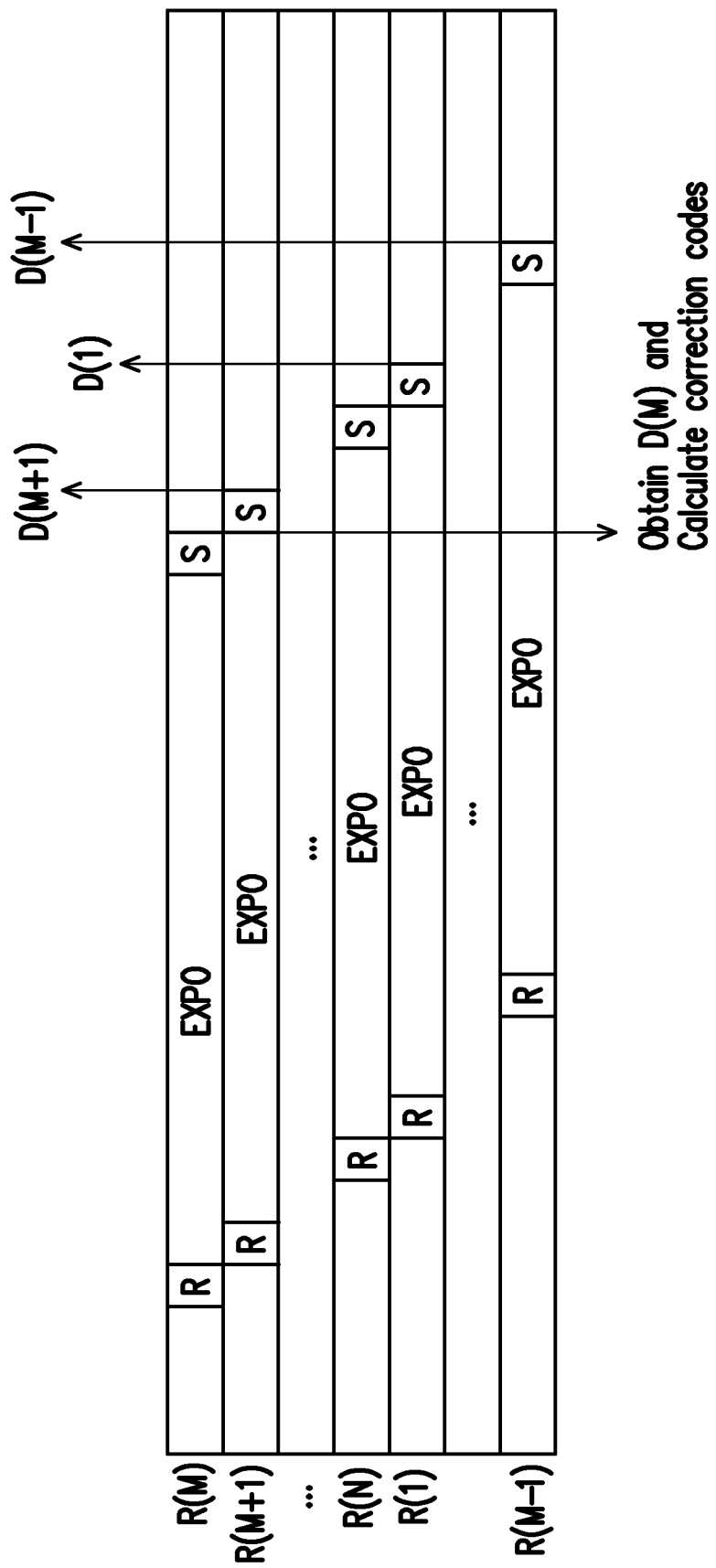
FIGS. 5A and 5B illustrate exemplary sequences of reading a plurality of rows of a fingerprint sensor in accordance with some embodiments.
Figure 5B:
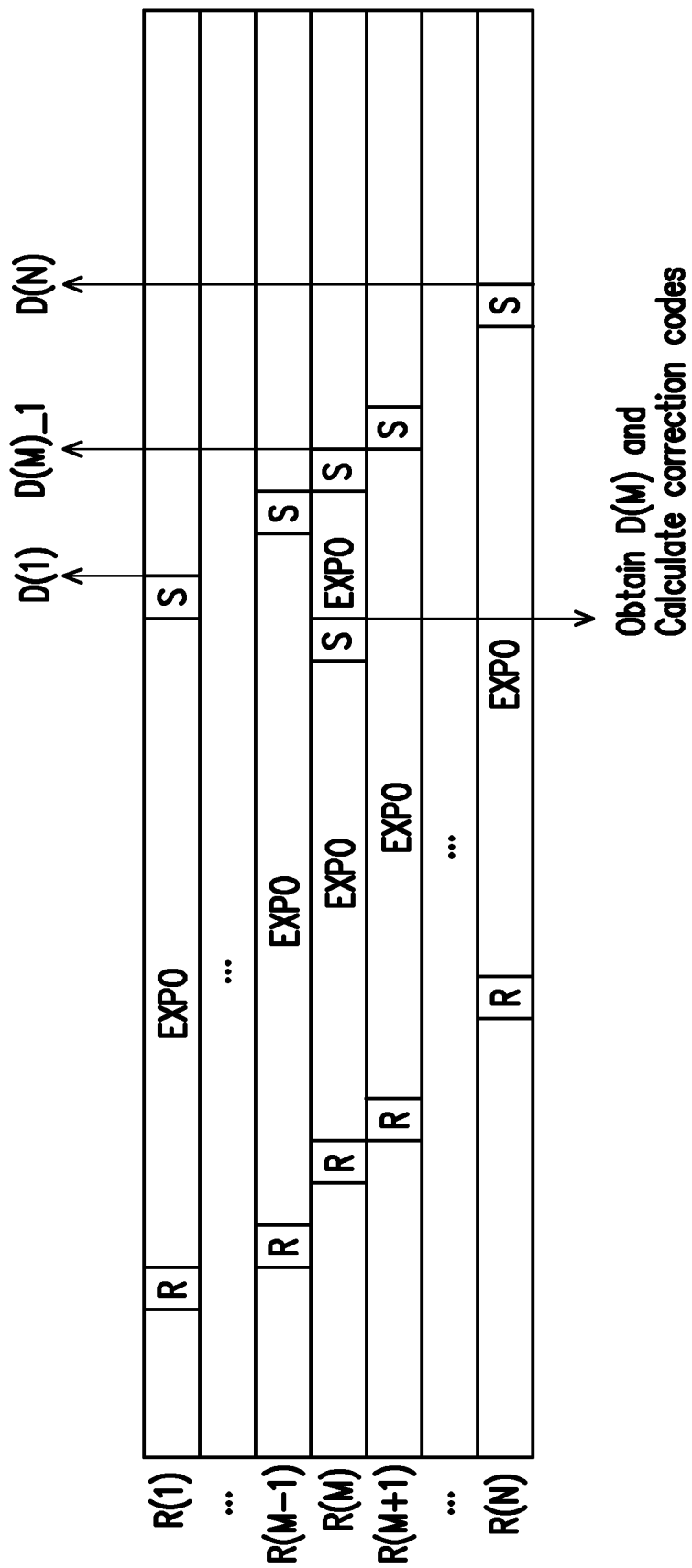

FIG. 5A and FIG. 5B illustrate exemplary sequences of reading a plurality of rows R(1) through R(N) of a fingerprint sensor (i.e., fingerprint sensor 110 in FIG. 1) in accordance with some embodiments. Referring to FIG. 1 and FIG. 5A, the fingerprint sensing operation for reading each of the rows R(1) through R(N) of the fingerprint sensor 110 includes a reset operation R, an exposure operation EXPO and a sampling operation S. The reset operation R, the exposure operation EXPO and the sampling operation S of each fingerprint sensing operation is sequentially performed to read data from each row of the fingerprint sensor 110. The reset operation R is configured to reset at least one pixels of the fingerprint sensor 110. The exposure operation EXPO is performed following the rest operation to expose the at least one pixel in an exposure time period. The sampling operation S samples the image signal to generate the output digital code D.

Referring to FIG. 5A, the fingerprint sensing operation is performed to read the fingerprint data from predetermined row R(M) to generate the output digital code D(M). The output digital code D(M) of the predetermined row R(M) is used to calculate the correction values, such as the brightness correction value, the RI correction value, the gain value. In some embodiments, the predetermined row R(M) is the central row of the fingerprint sensor 110. After the correction values are calculated based on the output digital code D(M), the fingerprint sensing operations are performed to read sequentially the fingerprint data from the other rows of the fingerprint sensor 110 starting from the adjacent row R(M+1). In other words, after the row R(M) is read and the correction values are calculated, the rows R(M+1) to R(N) and row R(1) through R(M−1) are sequentially read to generate the image signals of the user's fingerprint. The image signals generated by reading the rows R(M+1) to R(N) and row R(1) through R(M−1) are corrected by the correction values to generate the output digital codes D(1) through D(N).

Referring to FIG. 5B, a difference between the fingerprint sensing operations in FIG. 5A and those in FIG. 5B is that a sequence of reading the rows R(1) through R(N) of the fingerprint image 110. In FIG. 5B, after the output digital code D(M) is obtained and the correction values are calculated, the rows of the fingerprint sensor 110 are sequentially read from the top row R(1) to the bottom row R(N). Another difference between the fingerprint sensing operations in FIG. 5A and those in FIG. 5B is that that the predetermined row R(M) is read twice, in which the first reading generates the output digital code D(M) and the second reading generate the output digital code D(M)_1. Because a time exposure difference between two readings of the predetermined row R(M) is relatively long, an interpolation operation may be performed to estimate the output digital code D(M)_1 in the second reading. In this way, the fingerprint sensing device may accurately estimate the digital code D(M)_1 in the second reading.

Figure 6A:
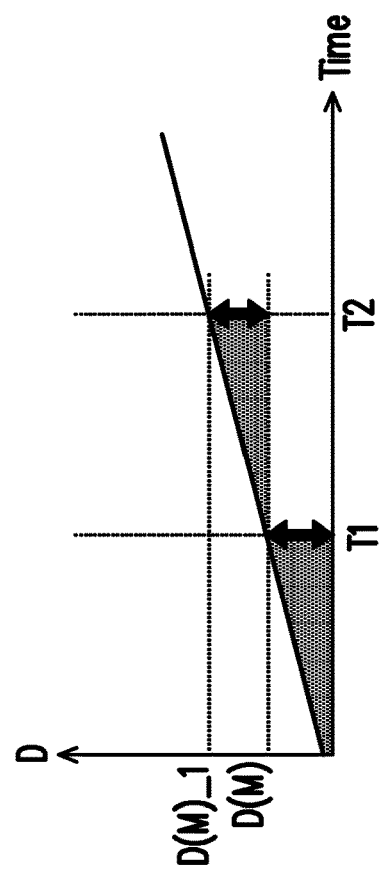
FIGS. 6A and 6B illustrate interpolation operations on fingerprint data read from a predetermined row of a fingerprint sensor in accordance with some embodiments.

The interpolation may be an intra-interpolation that is expressed in a diagram illustrated in FIG. 6A. The horizontal axis of the diagram in FIG. 6A illustrates the exposure time, and the vertical axis of the diagram in FIG. 6A illustrates the output digital code D outputted by the fingerprint sensing device. When the predetermined row R(M) is read under the exposure time of T1, the output digital code D(M) is outputted. As such, when the predetermined row R(M) is read under the exposure time of T2, the output digital code D(M)_1 should be proportional to a difference between T2 and T1. In some embodiments, the intra-interpolation operation to calculate the output digital code D(M)_1 is defined in equation (4), in which T1 and T2 are exposure time periods, D(M) is the output digital code when reading the predetermined row R(M) under the exposure time period T1, and D(M)_1 is the output digital code when reading the predetermined row R(M) under the exposure period T2.

$$D(M)\_1 = D(M) + D(M) \cdot \frac{T_2 - T_1}{T_1} \quad (4)$$

Figure 6B:
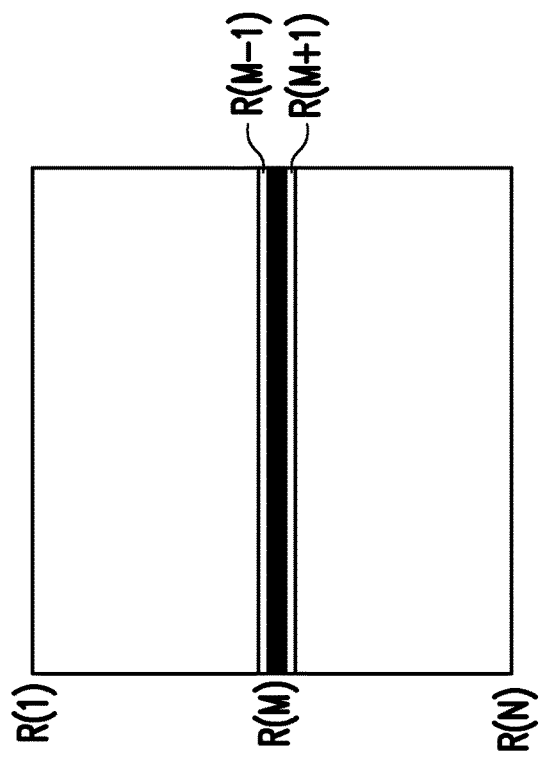

In some alternative embodiments, the interpolation operation may be extra-interpolation that is illustrated in FIG. 6B. As such, the output digital code D(M)_1 corresponding to the predetermined row R(M) could be estimated according to the output digital codes corresponding to adjacent rows (i.e., rows R(M+1) and R(M−1)). The disclosure does not intend to limit a technique for performing the extra-interpolation. Any techniques that can infer a value/code of a row from values/codes of adjacent rows should fall within the scope of the disclosure.

Figure 7A:
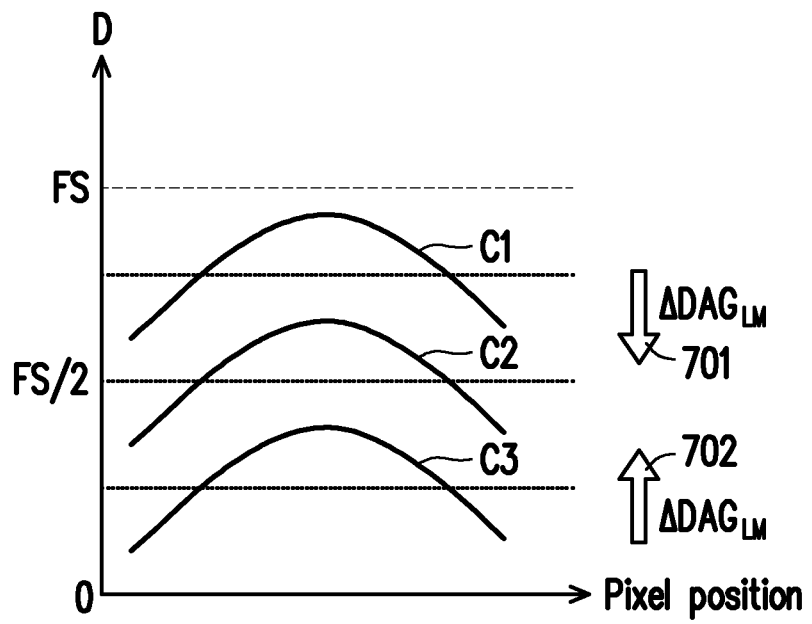
FIG. 7A and FIG. 7B are diagrams illustrating a brightness correction in accordance with some embodiments.
Figure 7B:
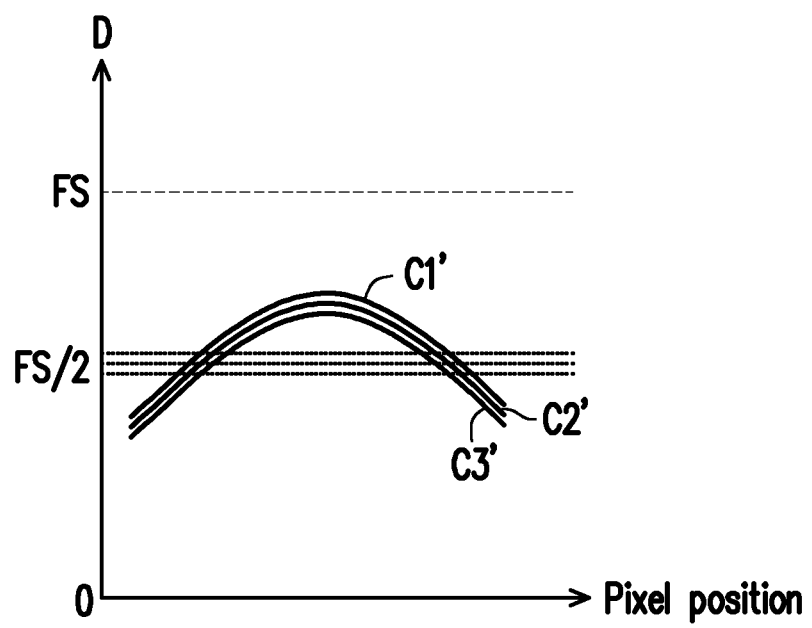

In step S250 of FIG. 2, a brightness correction is performed to correct offsets caused by noises and brightness variations on the image signal 131 according to the correction values (i.e., brightness correction value $\Delta DAC_{LM}$). Referring to FIG. 1 and FIG. 2, the DAC 150 may convert the brightness correction value $\Delta DAC_{LM}$ to the brightness correction signal; and the compensation circuit 140 compensates the image signal 131 using the correction signal 151 to generate the compensated signal 141. FIG. 7A illustrates the output digital codes (i.e., curves C1, C2, C3) before performing the brightness correction, and FIG. 7B illustrates the output digital codes (i.e., curves C1', C2', C3') after performing the brightness correction in accordance with some embodiments. In FIG. 7A and FIG. 7B, the horizontal axis represents the pixel positions in each row of the fingerprint sensor 110, and the vertical axis represent the output digital code from each row. In FIG. 7A, before the brightness correction, the output digital codes (i.e., curves C1, C2, C3) may spread over the full scale range FS of the ADC 164. The brightness correction is configured to shift the curves C1, C2, C3 by a shift amount corresponding to brightness correction value $\Delta DAC_{LM}$ toward the center of the full scale range (i.e., a range around FS/2). The arrows 701 and 702 in FIG. 7A illustrate the shift of the curves C1, C2, C3 toward the center (FS/2) of the full scale range. After the brightness correction is performed, the curves C1, C2, C3 shift toward the center (FS/2) of the full scale range to be the C1', C2' and C3' in FIG. 7B. As shown in FIG. 7A and FIG. 7B, the output digital codes (i.e., curves C1, C2, C3) reading from the rows of the fingerprint sensor 110 are shifted toward and locked at the center range (the range around FS/2) of the ADC 164. In this way, the offsets caused by brightness variations and noises are removed, the resolution of the ADC 164 is improved, and the performance of the fingerprint sensing and recognition are improved.

Figure 8:
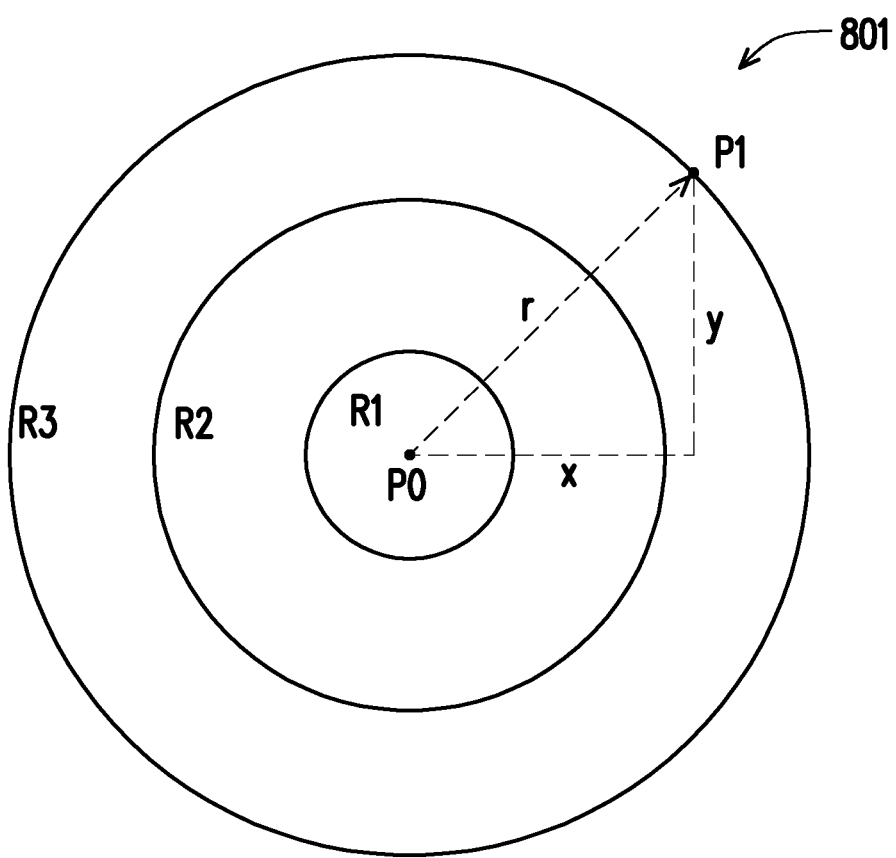
FIG. 8 illustrates a fingerprint image frame for RI correction in accordance with some embodiments.

In step S260 of FIG. 2, a RI correction is performed to correct offsets caused by RI characteristic of the lens according to the correction values (i.e., RI correction value $\Delta DAC_{RI}$ (r). Referring to FIG. 1 and FIG. 2, the DAC 150 may convert the RI correction value $\Delta DAC_{RI}(r)$ to the RI correction signal; and the compensation circuit 140 compensates the image signal 131 using the RI correction signal to generate the compensated signal 141. If the lookup table is used to store the RI correction value $\Delta DAC_{RI}$ (r) corresponding to each pixel of the fingerprint sensor 110, the fingerprint data from each pixel may be corrected using the corresponding RI correction value $\Delta DAC_{RI}(r)$ stored in the lookup table. In some embodiments, for each pixel of the fingerprint sensor 110, a distance r from the pixel to the central pixel (central pixel corresponding to the center of the lens) is determined, and the correction value $\Delta DAC_{RI}$ (r) (or anti-RI value) corresponding to the distance r is used to correct the fingerprint data read from the pixel. For example, referring to FIG. 8 which illustrates a fingerprint image frame 801 reading from the pixels of the fingerprint sensor 110, the distance r from a pixel P1 to the central pixel P0 can be calculated according to coordinates x and y of the pixel P. As such, the correction value $\Delta DAC_{RI}(r)$ corresponding to the distance r may be used to compensate the fingerprint data read from the pixel P1. As shown in FIG. 8, the fingerprint image frame 801 may be divided into a plurality of regions R1, R2 and R3, in which the correction values $\Delta DAC_{RI}$ (r) for correcting the fingerprint data reading from pixels of each of the regions R1, R2 and R3 may be different. Generally, the pixels in peripheral regions (i.e., regions R2 and R3) should be adjusted more than the pixels in the central region R1 to compensate the RI characteristic that the relative illumination is higher at the central region. As a result of the RI correction, the offsets caused by the RI characteristic of lens are removed from the compensated signal (i.e., compensated signal 141).

After the brightness correction and the RI correction are performed in steps S250 and S260, the offsets on the image signal (i.e., image signal 131 in FIG. 1) are compensated, and the peaks and valleys of the fingerprint are retained in the compensated signal (i.e., compensated signal 141 in FIG. 1). In step S270 of FIG. 2, a signal enhancement is performed according to gain value G to enhance the amplitude of peaks and valleys of fingerprint in the compensated signal 141. Referring to FIG. 1 and FIG. 2, the gain G may be provided to the output circuit 160, and the AFE circuit 162 of the output circuit 160 is configured to amplify the compensated signal 141 according to the gain G. In some embodiments, the AFE circuit 162 may multiply the compensated signal 141 with the gain G to generate an amplified signal 1621 at the output of the AFE circuit 162. However, the disclosure is not limited thereto, and any technique to amplify the compensated signal 141 according to gain G falls within the scope of the disclosure.

Figure 9A:
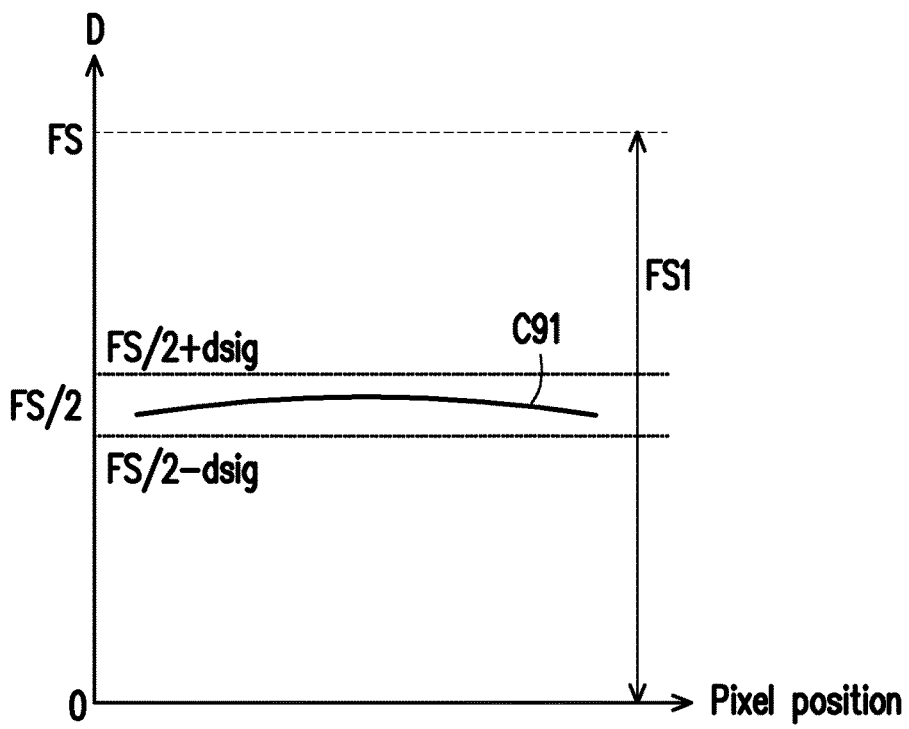
FIG. 9A through 9C are diagram illustrating a signal enhancement and a adjustment of a full scale range in accordance with some embodiments.
Figure 9B:
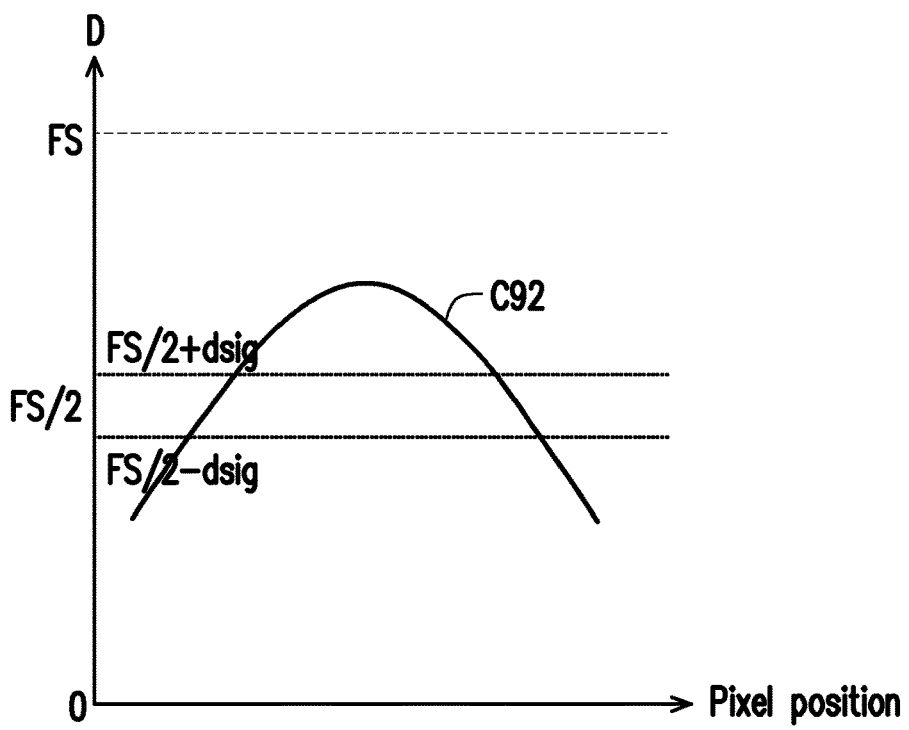

FIG. 9A and FIG. 9B are diagrams illustrating an amplification of the compensated signal 141 according to the gain value G in accordance with some embodiments. The vertical axis of the diagrams represents the output digital code D, and the horizontal axis of the diagrams represents the pixel position in rows of the fingerprint sensor 110. In an example, the output digital code corresponding to the compensated signal 14 is represented as the curve C91 in FIG. 9A. As shown in FIG. 9A and FIG. 9B, the curve C91 is amplified according to the gain G to generate the curve C92, in which the peak-to-valley difference (or the swing range) of the curve C92 is greater than the peak-to-valley difference (or the swing range) of the curve C91. In other words, the AFE circuit 162 may increase the peak-to-valley difference of the fingerprint, thereby improving the signal quality of the compensated signal 141. The swing range of the curve C92 after the amplification may be smaller than or equal to a full scale range FS1 of the ADC 164.

Figure 9C:
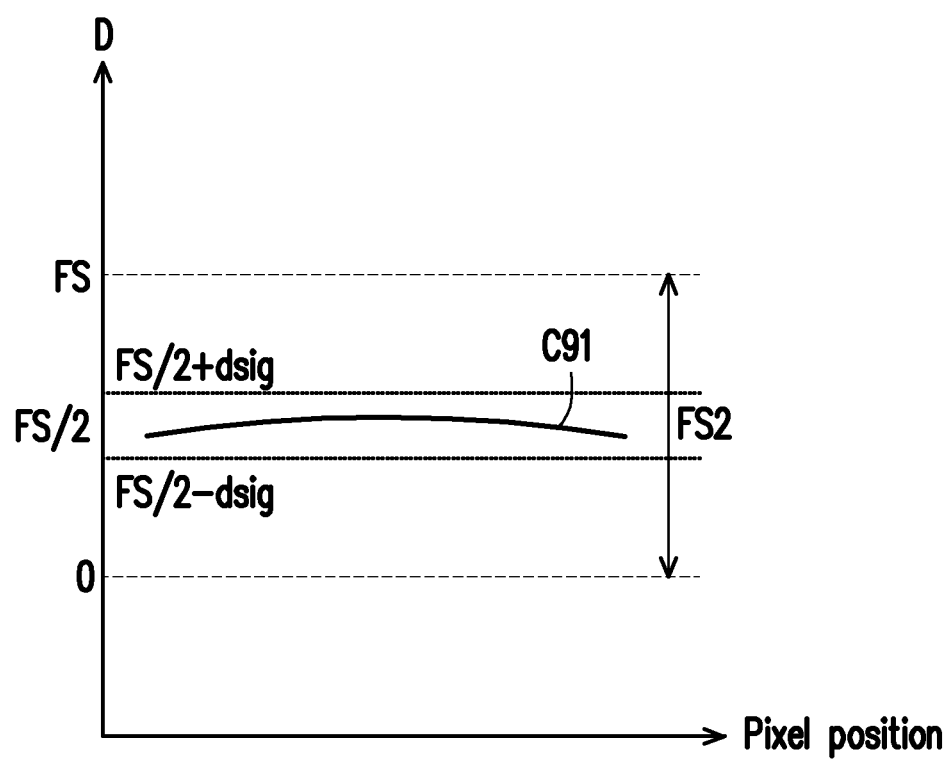

In some embodiment, the full scale range FS1 of the ADC 164 may be adjusted according to the gain G to improve the resolution of the ADC 164. Referring to FIG. 9A and FIG. 9C, the full scale range FS1 of the ADC 164 is adjusted according to the gain G to be a new full scale range FS2, in which the full scale range FS2 is smaller than the full scale range FS1. In this way, the resolution of the ADC 164 may be increased, and the performance of the fingerprint recognition of the fingerprint sensing device 100 is improved. In some embodiments, as the gain G is greater, the adjustment amount of the full scale range is greater. The disclosure does not intend to limit the amount of adjustment of the full scale range of the ADC 164.

Figure 10:
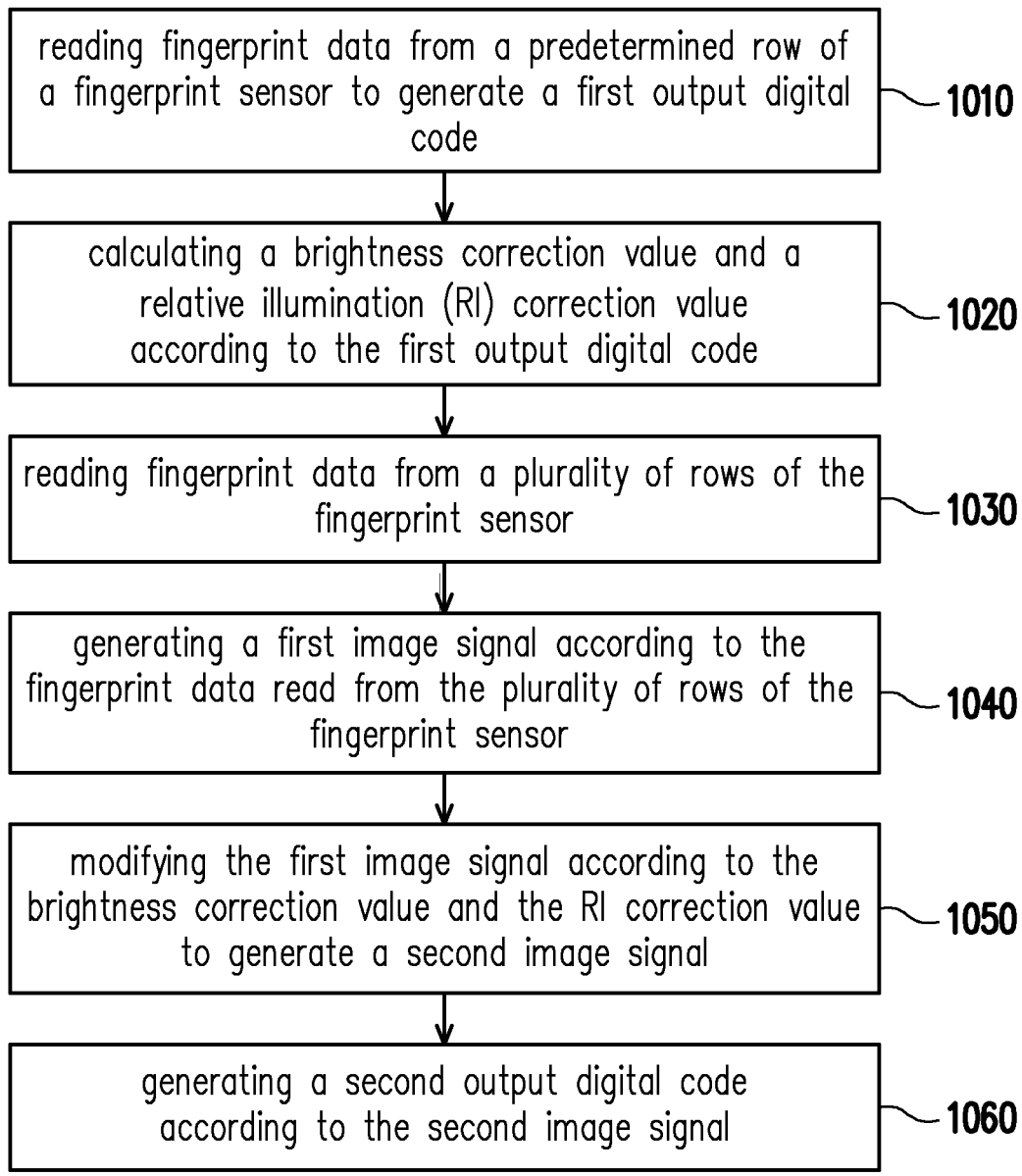
FIG. 10 is a flowchart diagram illustrating a signal processing method in accordance with some embodiments.

FIG. 10 is a flowchart diagram of a signal processing method adaptable for a fingerprint sensing device in accordance with some embodiments. In step S1010, fingerprint data is read from a predetermined row of a fingerprint sensor to generate a first output digital code. In step S1020, a brightness correction value and a relative illumination (RI) correction value are calculated according to the first output digital code. In steps S1030 and S1040, fingerprint data from a plurality of rows of the optical fingerprint sensor is read, and a first image signal is generated according to the fingerprint data read from the plurality of rows of the optical fingerprint sensor. In step S1050, the first image signal is modified according to the brightness correction value and the RI correction value to generate a second image signal. In step S1060, a second output digital code is generated according to the second image signal.

From the above embodiments, correction values such as a brightness correction value, a RI correction value and a gain value are calculated according to a first output digital code reading from a predetermined row of a fingerprint sensor. The correction values are used to correct the image signal (or fingerprint image signal) reading from the plurality of the rows of the fingerprint sensor. In this way, the offsets caused by different factors are corrected in one single image frame, resulting in a quick and accurate fingerprint sensing and recognition. In addition, the amplitude of peaks and valleys of fingerprint in the fingerprint image signal may be enhanced according to the calculated gain value to improve the signal quality of the fingerprint image signal. Furthermore, the full scale range of the ADC may be adjusted according to the calculated gain value to enhance the resolution of the ADC. In this way, the performance of the fingerprint recognition of the fingerprint sensing device is improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fingerprint sensing device, comprising:
a readout circuit, configured to read fingerprint data from a plurality of rows of a fingerprint sensor;
a first analog front end (AFE) circuit, configured to generate a first image signal according to the fingerprint data read from the plurality of rows of the fingerprint sensor;
a correction circuit, configured to:
receive a first output digital code that is generated by reading a predetermined row among the plurality of rows of the fingerprint sensor; and
calculate a brightness correction value and a relative illumination (RI) correction value according to the first output digital code;
a compensation circuit, configured to modify the first image signal according to the brightness correction value and the RI correction value to generate a second image signal; and
an output circuit, configured to generate a second output digital code according to the second image signal.

2. The fingerprint sensing device of claim 1, further comprising:
a digital to analog converter, coupled to the correction circuit, configured to convert the brightness correction value and the RI correction value to a brightness correction signal and a RI correction value signal, wherein the brightness correction signal and the RI correction value signal are analog signals,
wherein the compensation circuit comprises an adder circuit that is coupled to the digital to analog converter and the first AFE circuit, and the adder circuit is configured to add the brightness correction signal and the RI correction value signal to the first image signal to generate the second image signal.

3. The fingerprint sensing device of claim 1, wherein the correction circuit is further configured to calculate a gain value according to the first output digital code.

4. The fingerprint sensing device of claim 3, wherein the output circuit comprises:
a second AFE circuit, coupled to the compensation circuit, configured to amplify the second image signal according to the gain value to generate a third image signal; and
an analog to digital converter, coupled to the second AFE circuit, configured to convert the third image signal to generate the second output digital code,
wherein correction circuit is configured to calculate the gain value according to a full scale range of the analog to digital converter and a swing range of the second image signal, and the full scale range of the analog to digital converter corresponds to an operating voltage range of the analog to digital converter.

5. The fingerprint sensing device of claim 4, wherein the fingerprint sensing device is further configured to adjust the full scale range of the analog to digital converter according to the gain value.

6. The fingerprint sensing device of claim 1, wherein the predetermined row of the fingerprint sensor includes a plurality of pixels,
the first output digital code includes a plurality of pixel digital codes corresponding to the plurality of pixels, and
the correction circuit is configured to calculate the brightness correction value according to a mean value of the plurality of pixel digital codes, a full scale range of the analog to digital converter, and a number of bits of the analog to digital converter.

7. The fingerprint sensing device of claim 4, wherein the correction circuit is configured to calculate the RI correction value according to a number of bits of the analog to digital converter and a distance from a pixel of the fingerprint sensor to a central pixel of the fingerprint sensor, wherein the central pixel of the fingerprint sensor corresponds to a central point of a lens of the fingerprint sensing device.

8. The fingerprint sensing device of claim 1, wherein the predetermined row among the plurality of rows is a central row of the fingerprint sensor.

9. The fingerprint sensing device of claim 8, wherein after the brightness correction value and the RI correction value are calculated according to the first output digital code, the fingerprint sensing device is configured to read sequentially the fingerprint data from the plurality of rows of the fingerprint sensor starting from an adjacent row of the predetermined row of the fingerprint sensor.

10. The fingerprint sensing device of claim 8, wherein after the brightness correction value and the RI correction value are calculated according to the first output digital code, the fingerprint sensing device is configured to read sequentially the fingerprint data from the plurality of rows of the fingerprint sensor starting from a top row of the plurality of rows to a bottom row of the plurality of rows.

11. The fingerprint sensing device of claim 10, wherein the fingerprint sensing device is configured to read the predetermined row of the fingerprint sensor in a first reading and a second reading,
the fingerprint sensing device is further configured to perform an interpolation operation to estimate an output digital code of the predetermined row in the second reading according to an output digital code of the predetermined row in the first reading.

12. A signal processing method, comprising:
reading fingerprint data from a predetermined row of a fingerprint sensor to generate a first output digital code;
calculating a brightness correction value and a relative illumination (RI) correction value according to the first output digital code;
reading fingerprint data from a plurality of rows of the fingerprint sensor;
generating a first image signal according to the fingerprint data read from the plurality of rows of the fingerprint sensor;
modifying the first image signal according to the brightness correction value and the RI correction value to generate a second image signal; and
generating a second output digital code according to the second image signal.

13. The signal processing method of claim 12, wherein the modifying the first image signal according to the brightness correction value and the RI correction value to generate the second image signal comprising:
converting the brightness correction value and the RI correction value to a brightness correction signal and a RI correction value signal, wherein the brightness correction signal and the RI correction value signal are analog signals; and add the brightness correction signal and the RI correction value signal to the first image signal to generate the second image signal.

14. The signal processing method of claim 12, wherein the generating the second output digital code according to the second image signal comprises:
   calculating a gain value according to the first output digital code;
   amplifying the second image signal to generate a third image signal according to the gain value; and
   converting the third image signal to generate the output digital code,
   wherein gain value is calculated according to a full scale range of an analog to digital converter and a swing range of the second image signal, and the full scale range of the analog to digital converter corresponds to an operating voltage range of the analog to digital converter.

15. The signal processing method of claim 14, further comprising:
   adjusting the full scale range of the analog to digital converter according to the gain value.

16. The signal processing method of claim 14, wherein the reading fingerprint data from the plurality of rows of the fingerprint sensor comprises:
   reading sequentially the fingerprint data from the plurality of rows of the fingerprint sensor starting from a top row of the plurality of rows to a bottom row of the plurality of rows.

17. The signal processing method of claim 14, wherein
   the predetermined row of the fingerprint sensor includes a plurality of pixels, the first output digital code includes a plurality of pixel digital codes that are read from the plurality of pixels, and
   the brightness correction value is calculated according to a mean value of the plurality of pixel digital codes, a full scale range of the analog to digital converter, and a number of bits of the analog to digital converter.

18. The signal processing method of claim 14, wherein
   the RI correction value is calculated according to a number of bits of the analog to digital converter and a distance from a pixel of the fingerprint sensor to a central pixel of the fingerprint sensor, wherein the central pixel of the fingerprint sensor corresponds to a central point of a lens of the fingerprint sensing device.

19. The signal processing method of claim 12, wherein the predetermined row among the plurality of rows is a center row of the fingerprint sensor.

20. The signal processing method of claim 12, wherein the reading fingerprint data from the plurality of rows of the fingerprint sensor comprises:
   reading sequentially the fingerprint data from the plurality of rows of the fingerprint sensor starting from an adjacent row of the predetermined row of the fingerprint sensor.

* * * * *